United States Patent [19]

Gagne

[11] 4,157,908

[45] Jun. 12, 1979

[54] METHOD AND APPARATUS FOR THICKNESS CONTROL OF FLOAT GLASS WITH TOOTHED CYLINDRICAL MEMBER THAT HAS AXIS EXTENDED IN THE DIRECTION OF GLASS FLOW

[75] Inventor: Robert Gagne, New Kensington, Pa.

[73] Assignee: PPG Industries, Inc., Pittsburgh, Pa.

[21] Appl. No.: 939,142

[22] Filed: Sep. 1, 1978

[51] Int. Cl.² .............................................. C03B 18/02
[52] U.S. Cl. .................................... 65/99 A; 65/182 R
[58] Field of Search ............................ 65/99 A, 182 R

[56] References Cited

U.S. PATENT DOCUMENTS

| | | | |
|---|---|---|---|
| 3,373,008 | 3/1968 | Lawrenson et al. | 65/182 R |
| 3,493,359 | 2/1970 | Lawrenson | 65/182 R |
| 3,520,672 | 7/1970 | Greenler et al. | 65/99 A |
| 3,533,772 | 10/1970 | Itakura et al. | 65/182 R |
| 3,692,508 | 9/1972 | Prislan | 65/99 A X |
| 3,713,797 | 1/1973 | Lawrenson | 65/99 A X |
| 4,074,994 | 2/1978 | Glikman et al. | 65/182 R X |

*Primary Examiner*—Arthur D. Kellogg
*Attorney, Agent, or Firm*—Paul A. Leipold

[57] ABSTRACT

Method and apparatus for achieving other than equilibrium thickness of float glass is disclosed. The thickness of the float glass is regulated by applying a rotating, toothed cylindrical member to the upper surface of molten glass as it moves on a molten metal bath. The cylindrical member preferably has teeth in a worm arrangement and is utilized with its axis parallel to a plane normal to the glass surface and extending in the direction of the movement of the glass ribbon.

22 Claims, 13 Drawing Figures

 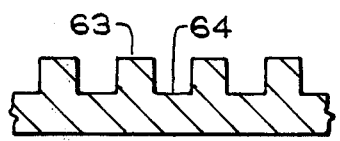 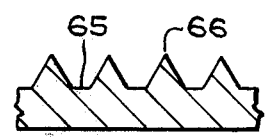
Fig.6a     Fig.6b     Fig.6c
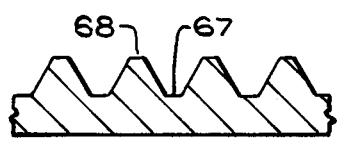 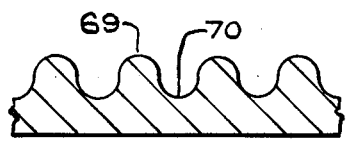
Fig.6d     Fig.6e
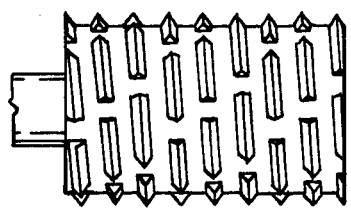
Fig.7
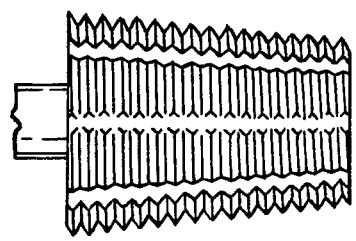
Fig.8

METHOD AND APPARATUS FOR THICKNESS CONTROL OF FLOAT GLASS WITH TOOTHED CYLINDRICAL MEMBER THAT HAS AXIS EXTENDED IN THE DIRECTION OF GLASS FLOW

BACKGROUND OF THE INVENTION

1. Field of the Invention

This invention relates to a method and apparatus for applying forces to glass being formed into a continuous sheet of glass while floating on molten metal. More particularly the invention relates to method and apparatus for more efficient regulation of forces to either spread the glass to a thinner than equilibrium condition or prevent the glass from becoming as thin as in equilibrium conditions.

2. Description of the Prior Art

The following U.S. Patents describe the devices and methods for regulating the thickness of a layer of glass floating on a molten metal bath to achieve a thickness other than equilibrium.

U.S. Pat. No. 3,695,859 to Dickinson et al discloses a method of float glass formation wherein several pairs of tractive rollers are applied to the top surface of float glass to control the width of the glass during attenuation.

U.S. Pat. No. 3,661,548 to Ito et al discloses the application of a series of toothed wheels in freely rotating contact with a floating glass ribbon. The wheels are angled outwardly in order to widen the floating glass ribbon beyond equilibrium width.

U.S. Pat. No. 3,684,471 to Matsushita discloses the application of a series of driven wheels to a molten glass ribbon to cause it to have a width wider than equilibrium. The rollers or wheels are electrically conductive and are used to heat the ribbon in order to aid in the widening of the ribbon.

Greenler et al, U.S. Pat. No. 3,520,672, discloses a method wherein a series of driven knurled rolls are applied to a glass ribbon in order to attenuate it beyond equilibrium thickness.

U.S. Pat. No. 3,929,444 to May et al, discloses a process wherein edge rollers such as in the above patents are applied from an overhead rail in order to eliminate crowding caused by the conventional application of the rollers to the glass ribbon floating on molten metal.

U.S. Pat. No. 3,713,797 to J. Lawrenson discloses apparatus wherein a rotary member having a vertical axis is utilized to laterally stretch a molten glass ribbon by engaging the ribbon margins with the edge of the rotary member and impelling it outwardly.

The above processes suffer from the disadvantage that their efficiency is low requiring several systems of rollers. This leads to cluttering of the area around the furnace with these controls and further requires a complicated regulation system to change the angle, speed and pressure of these rollers in order to regulate the thickness of the glass being formed. The construction and maintenance of several banks of rollers requiring cooling and regulation means is expensive and limits the amount of other controls which may be allowed access to the furnace. Further, several of these mechanisms such as the Lawrenson U.S. Pat. No. 3,713,797 apparatus, require careful regulation of the area of contact between the edge of the glass sheet and the roller. This is not easily regulated when the location of the edge of the ribbon changes in response to other process factors.

SUMMARY OF THE INVENTION

It is an object of this invention to overcome the disadvantages of the prior processes and apparatus.

It is an additional object to produce flatter glass sheet.

It is another object to provide a mechanism for changing the thickness of float glass that does not limit access to the furnace.

It is further additional object to provide a roller that is more efficient in changing thickness of float glass than prior rollers.

It is another additional object of this invention to provide more stretch or inhibition of float glass per control machine.

These and other objects of the instant invention are generally accomplished by the utilization in a float glass forming chamber of a rotating toothed roller whose axis extends generally in the direction of glass movement and is substantially parallel to a plane that is extended in the direction of flow of the glass ribbon and normal to the bath surface. The toothed roller is generally cylindrical and inclined such that the upstream end is not below the glass surface while the downstream end is submerged below the surface to whatever depth necessary to achieve the desired change from equilibrium thickness although not extending below the level of the bottom surface of the glass. Depending upon tooth configuration and direction of rotation, the cylindrical member may be used to either attenuate the glass to less than equilibrium thickness or inhibit the spread of the glass such that a greater than equilibrium thickness ribbon is formed.

In a preferred form of the invention, the teeth of the cylinder are elongated and arranged generally in a worm configuration around the cylinder. The preferred shape of the tooth is a pointed ridge with a V-shaped valley between the adjacent teeth. Elongated teeth preferably form a spiral or worm structure around the surface of the cylinder. The cylinder is rotated such that the action of the teeth is either to restrict the spread of the glass to produce greater than equilibrium thickness or else to increase the spread so as to produce less than equilibrium thickness.

BRIEF DESCRIPTION OF THE DRAWINGS

FIGS. 6, 6a, 6b, 6c, 6d and 6e illustrate different surface features suitable for the apparatus of the invention.

FIG. 7 and FIG. 8 are views of other glass-forming member of the type suitable for the invention.

DETAILED DESCRIPTION OF THE PREFERRED EMBODIMENTS

The instant invention offers many advantages over prior art methods and apparatus for stretching float glass. The method and apparatus of the invention allows more stretching or inhibition of glass per machine applying force to the glass. This is an advantage as it frees areas near the forming chamber for other uses and additionally results in lower expenses as fewer machines have to be manufactured and maintained. Further, the use of apparatus of the invention results in a flatter glass sheet than prior processes. Additionally, the system of the invention produces less stress and flow markings in the glass than prior systems. It is theorized that the system of the invention produces less distortion in the glass as the gradual digging in and pulling out of the teeth arranged in a worm gives less distortion as each ridge or tooth of the generally cylindrical member only provides a slight movement of the glass and it is the combined effect of these many small movements which produce the very effective thickness regulation of the glass that this system allows. Therefore, the system of the invention while being more effective than prior systems also results in a better product having fewer defects in the glass than prior systems. Other advantages of the system of the invention will become clear from the description of the drawings which follows.

Figure 1:
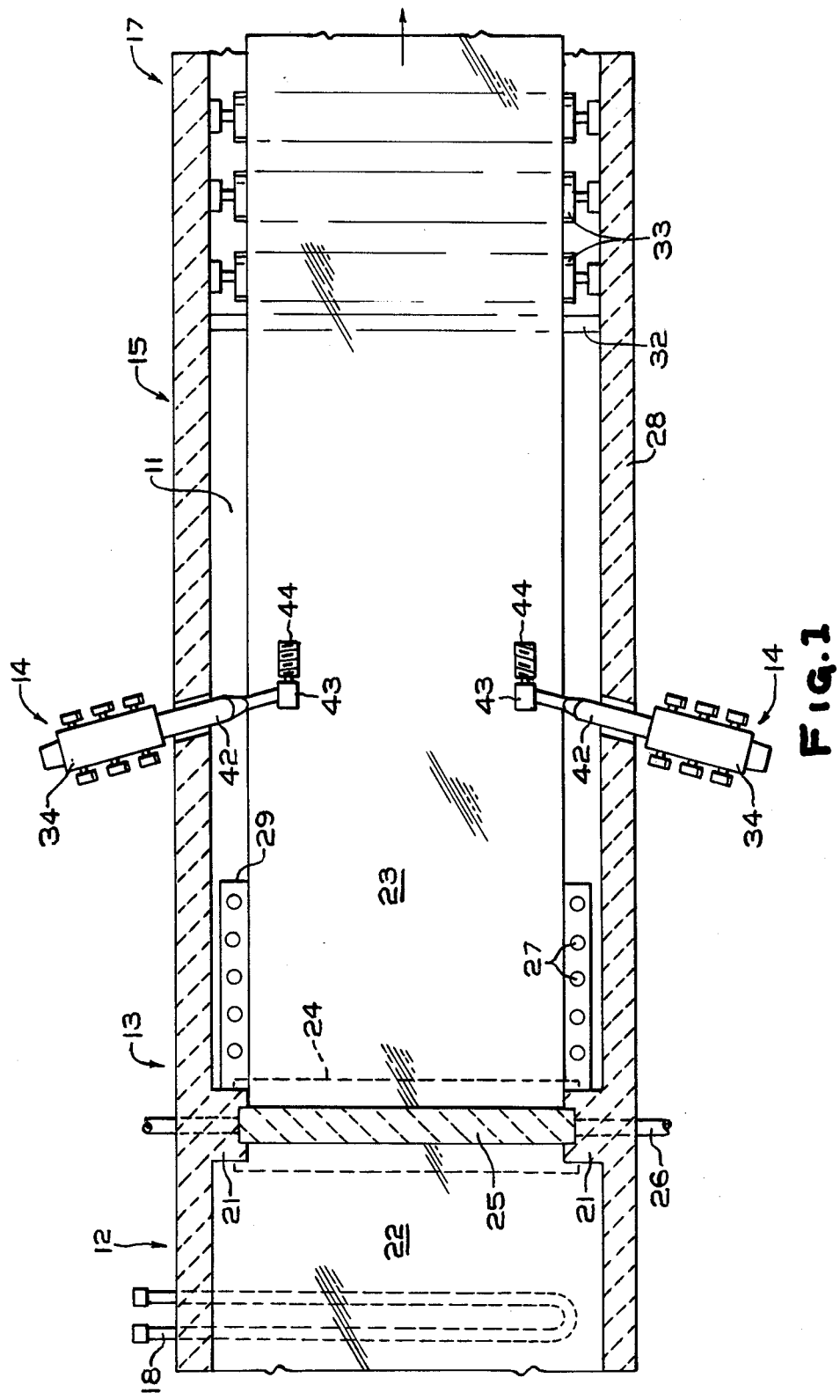
FIG. 1 is a plan section of the apparatus of the invention employing a tank structure for the float formation of glass ribbon.

Referring now to FIG. 1 there is shown a flat glassmaking apparatus including a glass furnace or tank terminating in a refiner 12 to which there is connected a molten glass delivery means 13, which in turn is connected to a glass forming chamber 15. This view in FIG. 1 is a plan view with the top of the furnace removed. Molten glass 22 in the refiner 12 is delivered onto a pool of molten metal 11 in the glass-forming chamber 15. This glass is then cooled and stretched to form a dimensionally stable continuous sheet of flat glass which, in turn, is taken from the forming chamber 15 by the take-out apparatus 17. Molten glass 22 in the refiner 12 is generally conditioned for delivery and forming by being cooled, for example, by a submerged cooler 18, as shown.

Molten glass 22 is caused to flow, in a preferred embodiment of this invention, over a threshold 24 directly onto the molten metal 11. The present invention is, however, not limited to including this particular delivery means and alternatively glass may be delivered by a delivery means such as described in U.S. Pat. No. 3,220,816 to Pilkington, wherein the glass is delivered down the long canal over a lip and caused to fall onto the pool of molten metal where it is generally permitted to spread. The threshold 24 is generally provided with means for cooling, such as cooling pipes 26 embedded in the threshold traverse to the movement of glass over the threshold. In addition to the threshold 24, the delivery means 13 also includes side members of jambs 21 that define the side boundaries of the channel through which molten glass may flow. The delivery means 13 further includes a metering member or tweel 25 extending downwardly toward the threshold 24. The tweel 25 engages the molten glass and controls the cross-sectional area of space defined by the tweel, threshold and jambs through which molten glass may flow onto the molten metal 11 in the forming chamber.

The forming chamber 15 includes a pair of sidewalls 28. In a preferred embodiment of this invention, the sidewalls 28 are generally parallel to one another and parallel to the direction of glass movement, as shown by the arrow in FIG. 1. Nevertheless, the present invention is applicable to a forming chamber having a conventional "shoulder" structure. The forming chamber includes a roof portion not shown. The roof portion and the upper sidewalls, not shown, form on the end of the chamber a space above the molten metal which is an atmosphere space, filled with a protective atmosphere to prevent oxidation of the molten metal. The gases in the atmosphere may be inert gases, reducing gases, or a combination of inert and reducing gases. The forming chamber includes a bottom or container portion which contains the molten metal bath 11. The bottom portion includes the side portion 28 extending above the elevation of the surface of the molten metal in the chamber. The bottom portion is generally supported on a structure beneath the forming chamber. The roof portion, not shown, and, the upper sidewalls, not shown, generally define a single structure that is suspended from supporting members extending above the chamber. A space relatively free of structural members separates the upper sidewalls from the bottom portion sidewalls 28 of the chamber substantially along the length of the chamber. This space is sealed during operation of the furnace but is sufficiently accessible to provide a plurality of locations from which devices may be extended into the forming chamber from outside the chamber or to provide locations for observation windows along the length of the float forming chamber. Inside the forming chamber 15 there may optionally be located guide members 29 extending from the vicinity of the delivery means 21 downstream to the forming chamber 15. These guides may be provided with means for controlling their temperature 27, such as heaters or coolers. Electric heaters are useful for controlling the temperature of such guides.

At the downstream end of the forming chamber 15 is an end dam 32, which serves to contain the molten metal within the forming chamber and to separate the forming chamber 15 from the take-out apparatus 17. The take-out apparatus 17, generally housed within a structure adjacent the forming chamber, comprises take-out rolls 33, which serve to lift a continuous sheet of glass up from the molten metal and apply tractive forces to the glass to convey it out through the forming chamber into a lehr or other conventional processing equipment. In addition to the take-out rolls 33, the take-out apparatus generally includes a seal not shown. The seal will usually be one or more flexible heat resisting curtains of fiber material such as silica cloth curtain, hanging down from a roof portion of the structure above the take-out rolls down to a location for contacting a continuous sheet of glass being drawn from the chamber. The applicant recognizes that the term "bath" has at times been used in the art to mean the pool of molten metal on which the glass is formed and at other times to mean the forming chamber when the glass sheet formation takes place on the molten metal bath. However, in this specification, the applicant intends to refer to the structure as the forming chamber and only use the term "bath" to refer to the pool of molten metal. The terms "ribbon" and "sheet" are used interchangeably to refer to the strip of glass formed on the bath in the forming chamber. The directions "upstream" and "downstream" are defined by the direction of glass flow through the process; that is, glass flows from an upstream portion of the glassmaking apparatus toward a downstream portion of the glassmaking apparatus.

The instant system is supported external to the forming chamber itself by a device such as machine 34. These support means 34 may be wheeled supports on the forming chamber apron or may be mounted on hangers on rails for movement along the side of the furnace. Devices for holding, cooling, and applying forces to equilibrium thickness changing devices or edge control devices are known in the art and are not themselves specific novel features of the instant invention. Reference may be had to above cited U.S. Pat. Nos. 3,929,444, May et al, and 3,713,797, Lawrenson, for descriptions of support devices.

Figure 2:
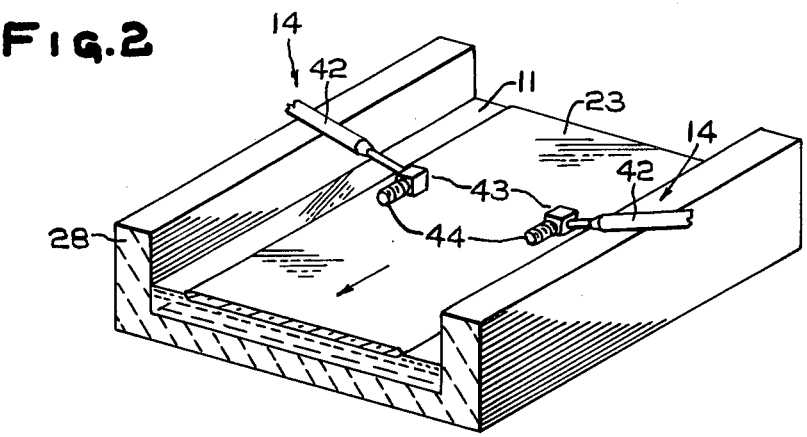
FIG. 2 is a diagrammatic fragmentary cutaway view of part of the apparatus of FIG. 1 illustrating the operation of the invention.

With reference to FIG. 1 and 2, the glass thickness control devices of the invention indicated generally as 14 are each composed of an elongated arm 42 holding an edge control device 44 that may be rotated in either direction depending on whether the sheet of glass must be restricted as to its width or it is desired that the glass be spread. The device indicated as 43 contains gearing to transfer motion to the cylindrical members 44 that control the glass width. The devices, as is conventional practice, are equipped with cooling channels to provide coolant to the edge control devices. The devices are located such that the downstream end is located away from the arm and positioned lower than the arm. The location of the width control device may be better seen in FIG. 3.

Figure 3:
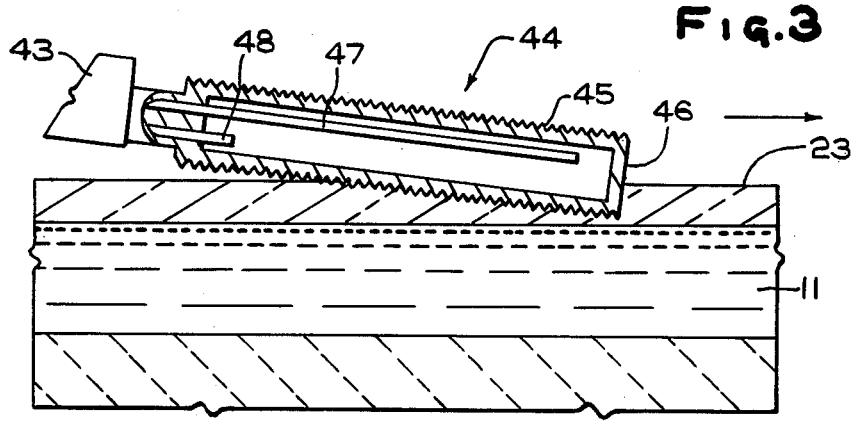
FIG. 3 is a cross-section of one of the cylindrical members of the invention being utilized in the forming of glass on a bath.

Referring to FIG. 3, as is illustrated the width control device is a cylindrical member 44 having teeth 45 and formed of a metal such as stainless steel forming the substrate for the teeth 46 and the teeth themselves 45. The width control device 44 is provided with cooling channels for inlet of a cooling liquid normally water at 47 and al outlet 48 wherein the cooling water may leave the width control device. The width control device is placed such that the end towards the suspending arm is above the surface of the glass. By being above the surface of the glass, a back-up or build-up of the glass does not occur where the width control device enters the glass. The downstream end is below the surface of the glass but above the surface of the tin. The amount of widening or inhibiting effect of the control device may be regulated by raising the device so that it does not extend as far through the glass layer. Other means of controlling the effect are speed of rotation of the control device and the size and frequency of the teeth which are arranged in a helical or worm pattern around the control device.

Figure 4:
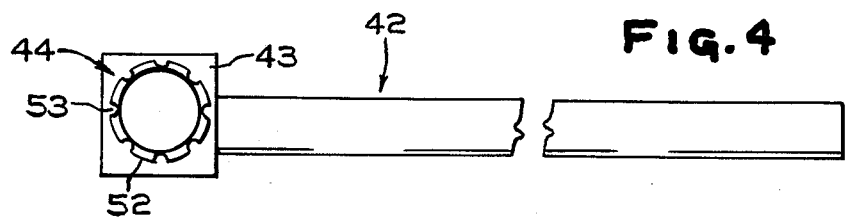
FIG. 4 is a view of an arm utilized to position the glass-forming member of the invention.
Figure 5A:
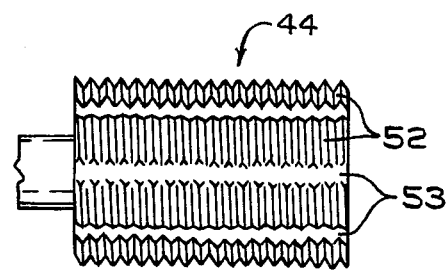
FIG. 5 is a view of a cylindrical member preferred for the glass-forming process and apparatus of the invention.
Figure 5B:
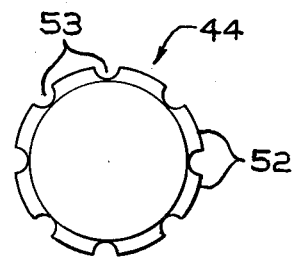

Referring to FIGS. 4 and 5, there is shown the arm 42 with gear mechanism 43 carrying the edge control mechanism 44 which, in this instance, comprises a cylindrical member whose surface comprises a series of grooves 53 separating a series of generally elongated peripherally running ridges 52. This form of edge control or width control device has been found to be a preferred structure as it is easy to form and highly effective. This structure is formed by providing screw threads to a cylindrical object and then milling the grooves 53 at whatever interval is desired such that the ridges of the threads form elongated generally circumferentially oriented teeth.

Referring to FIGS. 6 and 7, there are shown various forms of teeth. FIG. 6 illustrates in cross-section teeth which are suitable for use in a width control device such as utilized in this invention. As illustrated in 6a, the pointed teeth are separated by generally pointed valleys and correspond to the tooth structure formed by a screw thread. FIG. 6b illustrates the type of thread with flat raised ridges 63 and valleys 64 which also are flat. FIG. 6c illustrates a tooth structure with pointed ridges 66 and flat bottomed valleys 65. FIG. 6d illustrates a tooth structure of flat topped lands 68 and valleys 67 with sloping sides FIG. 6e illustrates a rounded ridge 69 in association with a rounded valley 70. Generally the tooth structures, such as 6a or 6c, exhibiting a sharper ridge are preferred as this apparently achieves a better grip on the molten glass and is more efficient in the spreading or inhibition of spreading that the system is capable of. The tooth surface of the invention may be arranged in any pattern but the teeth are preferably elongated and generally in the circumferential direction on the cylindrical member. FIG. 7 illustrates a tooth arrangement in which the teeth are staggered and not cut by grooves as in FIG. 5. The depth of the teeth on the cylindrical member may vary depending on the thickness and width of the glass being formed and additionally on the circumference of the cylindrical member and the number of cylindrical rollers utilized in a particular installation. Generally the teeth of a roller suitable for commercial float glass processes would be about $\frac{1}{4}$ inch intervals. The term tooth or teeth as used herein is intended to include any intermitent projections including ridges or points that are arranged on the surface of a generally cylindrical member in the circumferal arrangement of the invention. The diameter of the cylindrical width control device itself would generally be about 6 inches in order to accomodate the cooling devices for the interior and additionally provide enough working surface to effectively contact the glass.

The rollers of the invention may be made out of any material which is resistant to the temperatures encountered in float glass manufacture and additionally does not lead to harmful contaminants in the glass or cause sticking of the glass to the roller. Among suitable materials are carbon, refractories, refractory clad metals and steel. A preferred material for the width control system of the invention is stainless steel due to its ability to be worked and its known performance as an edge roller material.

The teeth of the instant invention may be arranged in any manner which achieves a desirable width control for the float glass. Preferably the teeth are arranged in a manner such that their longest dimension is generally circumferentially arranged on the roller. A suitable roller may be formed with elongated teeth directly on the circumference plane; however, this roller does not perform as well as those in which the teeth are skewed in a helical or worm pattern on the cylinder. It is theorized that the preferred worm elongated teeth arrangement imparts movement both parallel to the direction of travel of the glass ribbon and transverse to the direction of travel of the glass. However, with any tooth arrangement the glass is moved in the direction of movement of the lower portion of the rotating cylindrical members. This achieves less than equilibrium thickness when the bottom portion of the cylinder pushes toward the ribbon edge and greater than equilibrium thickness when the bottom portion pushes toward the center of the glass ribbon.

The preferred direction of rotation of a roller having the elongated worm teeth arrangement is such that a right turning screw teeth arrangement on the left side of the glass ribbon turned right acts to widen the glass. The left side is taken when facing downstream. The right side is widened by turning a left turning screw teeth arrangement to the left. A turning direction is determined by the direction of movement of the upper portion of the worm when viewed from an upstream position. Further, it is preferred for easy operation to inhibit the spread of the glass to give greater than equilibrium thickness merely by reversing the direction of rotation of the right turning toothed roller on the left side and the left turning helical teethed roller on the right side. The toothed arrangement as set forth above is such that when spreading the glass to less than equilibrium thickness the initial glass to tooth contact of each elongated tooth during rotation is on the downstream end of the tooth and final contact is on the upstream end of the tooth. The phrases left turning screw teeth arrangement and right turning screw teeth arrangement means that if the teeth of the helical tooth arrangement were connected the thread of a right turning or left turning screw would be formed.

While the description of the invention has referred to the member for controlling glass width as generally cylindrical, this term is meant to include in this instance articles which may be a conical frustum such as illustrated in FIG. 8. Such articles need not be inclined at the preferred 5° to about 15° angle to the plane of the glass surface but may be presented with the axis substantially horizontal. Then the threaded portion due to the conical shape is still angled such that the upstream edge is above the surface of the glass while the downstream edge is below the surface of the glass. It is also within the purview of this invention that a member of generally cylindrical shape but having a somewhat convex or concave surface may be utilized. Whatever the shape of the toothed member, the instant system requires that the axis of the member be oriented generally parallel with direction of movement of the glass ribbon on the bath. The deviation from parallel to a plane normal to the glass surface and extending in the direction of glass movement is not more than about 5° for effective use of the apparatus and method of the invention.

As will be apparent to those skilled in the art, the present system may be modified and equivalent elements or processes be employed in combination therewith without departing from the spirit of this invention. For instance, the novel control system of the invention might be employed on one side of the furnace in combination with several conventional roller wheel type thickness control devices on the other side of the furnace. Also several of the longitudinally oriented edge control devices of the invention might be employed in series rather than as illustrated in single control devices.

Thus, the present disclosure of the preferred embodiments of the present invention is not intended to limit the scope of the applicant's invention.

I claim:

1. A method of manufacturing float glass comprising delivering molten glass at a controlled rate to molten metal bath, forming an advancing layer of molten glass in ribbon form, contacting the upper surface of each margin of the glass layer with a cylindrical toothed member having its axis extending generally in the direction of travel of the glass, rotating said cylindrical member while the teeth of said member contact said molten glass to form the glass to other than equilibrium thickness.

2. The method of claim 1 wherein said teeth are elongated in the circumferential direction and angled to impart force when rotating transverse to the direction of flow.

3. The method of claim 1 wherein said teeth are elongated in the circumferential direction and angled and rotation is such that the teeth enter said glass with initial tooth contact with said glass on the downstream end of each tooth and final contact at the upstream end of each tooth and wherein the glass is spread to thinner than equilibrium thickness.

4. The method of claim 2 wherein said force transverse to the direction of glass flow is inward and increases the thickness of the ribbon.

5. The method of claim 2 wherein said force transverse to the direction of flow is toward the center of flow causing said glass layer to be greater than equilibrium thickness.

6. The method of claim 1 wherein said axis is generally parallel to a plane normal to the glass surface and extending in the direction of glass movement.

7. The method of claim 1 wherein said teeth are elongated in the circumferential direction but are not angled.

8. Apparatus for achieving other than equilibrium thickness of glass in a float glass process comprising a tank structure holding a bath of molten for supporting a molten glass layer as it is advanced along the surface of the molten metal, an elongated member extending over said bath of molten metal, thickness control means mounted on said elongated member providing means for applying force onto said molten glass layer wherein said thickness control means comprises a generally cylindrical member having its axis held generally parallel to a plane normal to the glass surface and extending in the direction of glass flow and having a surface of teeth and means to rotate said cylindrical member about its axis.

9. The apparatus of claim 8 wherein said teeth are elongated and skewed slightly from the direction of an arc forming a circumference of said cylinder.

10. The apparatus of claim 8 wherein said force is applied such that the upstream teeth of the cylinder are above the glass surface and the downstream teeth are below the glass surface.

11. The apparatus of claim 8 wherein said cylinder member and said elongated member are provided with cooling means.

12. The apparatus of claim 8 wherein said teeth are in a worm arrangement on said cylindrical member.

13. The apparatus of claim 8 wherein said axis extends generally in the direction of glass flow.

14. The apparatus of claim 8 wherein said cylindrical member is positioned such that one end of the cylinder is above the glass surface and the other end of said cylindrical member is below said glass surface.

15. A method for achieving other than equilibrium thickness float glass comprising contacting an advancing layer of molten glass with a toothed member rotating about its axis, wherein the axis of the toothed member is generally parallel with a plane that is normal to the surface of the advancing glass and extends in the direction of movement of the glass, rotating said member to move the glass in the direction that the lower portion of the member moves such that the molten glass is caused to attain other than equilibrium thickness.

16. The method of claim 15 wherein the toothed member is generally cylindrical and upstream end of said generally cylindrical member is not in contact with the surface and the downstream end of said member is partially below the surface of said molten glass.

17. The method of claim 15 wherein said teeth are elongated and helically arranged about said member such that a movement both traverse to the direction of glass flow and in the direction of glass flow is imparted to the molten glass by the teeth.

18. The method of claim 15 wherein a right turning toothed member turned right is utilized on the left of the molten glass ribbon and a left turning toothed member turned right is utilized on the right of said molten glass ribbon to widen said ribbon from equilibrium width.

19. The method of claim 18 wherein said right turning toothed member is turned left and said left turning member is turned right to narrow said ribbon from equilibrium width.

20. The method of claim 15 wherein a series of the cylindrical members are applied to said molten glass to achieve other than equilibrium thickness.

21. The method of claim 15 wherein said toothed member is the shape of a cone.

22. The method of claim 15 wherein said generally cylindrical member is held at an angle of between about 5° and about 15° from the horizontal with the downstream end below the surface of the glass.

UNITED STATES PATENT AND TRADEMARK OFFICE
CERTIFICATE OF CORRECTION

PATENT NO. : 4,157,908
DATED : June 12, 1979
INVENTOR(S) : Robert Gagne

It is certified that error appears in the above-identified patent and that said Letters Patent are hereby corrected as shown below:

Column 8, line 18, "molten" should read --molten metal--.

Signed and Sealed this

Twenty-fifth Day of September 1979

[SEAL]

Attest:

LUTRELLE F. PARKER
*Attesting Officer*   *Acting Commissioner of Patents and Trademarks*